Oct. 27, 1925.

H. C. E. JACOBY 1,559,436

DYNAMO ELECTRIC MACHINE

Filed March 12, 1925

Inventor
H.C.E. Jacoby

Patented Oct. 27, 1925.

1,559,436

UNITED STATES PATENT OFFICE.

HENRY CHARLES EDWARD JACOBY, OF LONDON, ENGLAND.

DYNAMO-ELECTRIC MACHINE.

Application filed March 12, 1925. Serial No. 15,069.

*To all whom it may concern:*

Be it known that I, HENRY CHARLES EDWARD JACOBY, a subject of the King of Great Britain, residing at London, England, have invented certain new and useful Improvements in Dynamo-Electric Machines, for which a British application No. 32,344/13 was filed Dec. 27th, 1923, and of which the following is a specification.

This invention relates to dynamo electric machines of the enclosed type which are provided with numerous tubes forming ducts for the hot internal air of the machine which is circulated through them by a fan, cold external air being circulated, by another fan, among the tubes on their outer sides so that the hot air is cooled before returning to the interior of the machine.

The object of the present invention is to enable a dynamo electric machine of this type to be constructed of much less weight than has hitherto been the case, and preferably with reduction in overall diameter without impairing the electrical efficiency or that of the cooling arrangements, so as to render the machine especially applicable for use in naval vessels and in other positions where light weight is a desideratum.

According to the present invention, a magnet ring having reduced ends is fitted with annular attachments which have air-circulating communication with the interior of the enclosed machine, and serve to support a system of hot-air cooling tubes around and in close proximity to the larger diameter of the magnet-ring and a system of cold air ducts around and in close proximity to each of the reduced ends thereof; thus providing for a compact arrangement of tubes and for a considerable reduction in the overall diameter and weight of the machine.

The invention also includes details hereinafter referred to, by which the weight is still further reduced and accessibility to the commutator and brushes is facilitated in spite of the compact form of the machine.

In the accompanying drawing:—

Figure 1:
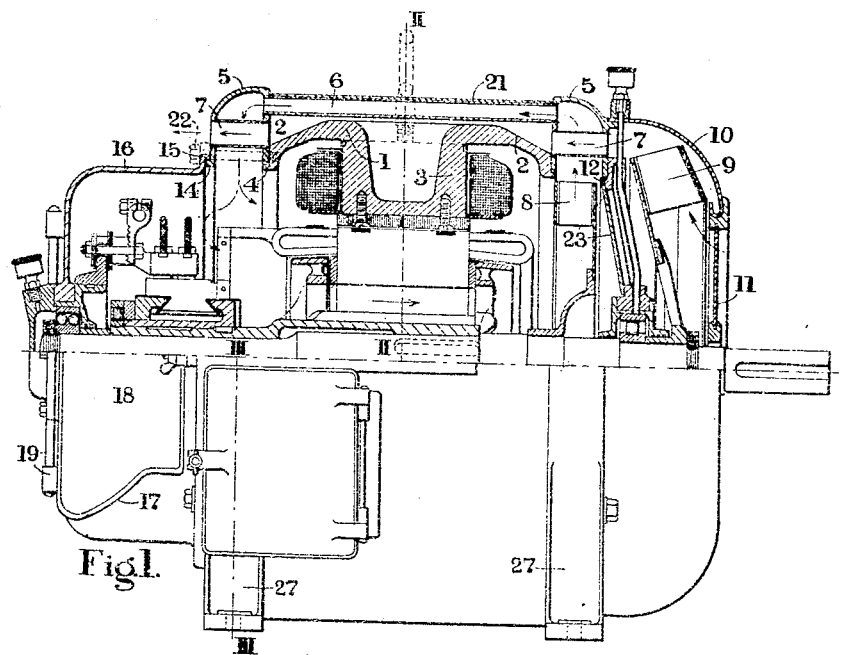
Figure 1 is a side elevation half in section of a motor according to the invention.

The enclosed direct current motor illustrated by way of example has a cast steel magnet ring 1 relatively wide but thin formed with conical ends 2 and main and intermediate pole pieces 3 between the ends. The main pole pieces may be hollow as shown to increase the cooling effect.

The ends 2 are preferably conical both inside and out and terminate in slight lips or flanges 4. These ends considerably strengthen the light rings so formed.

A tube support, in the form of an annular gutter 5, is mounted on each end of the magnet ring, the lip 4 being shaped to receive it. The gutters 5 are only of sufficient diameter to carry the cooling tubes 6 for the hot air, just clear of the magnet ring 1 at its larger diameter.

Each gutter 5 is also provided with ducts for the cold external air, preferably in the form of tubes 7 which are situated adjacent to the conical ends 2 of the magnet ring 1, so that the cold air is directed on to the outer conical surface of the ring at one end and after passing among the cooling tubes 6 escapes down over the conical surface at the opposite end out through the tubes 7 in the gutter 5 at that end. The hot internal air is circulated through the gutter 5 at one end by a fan 8 situated inside the motor casing and the cold external air is delivered into the short tubes 7 by another fan 9 situated outside the casing but within a guard 10 having a perforated or expanded metal inlet screen 11. The adjacent gutter 5 rests in rabbeted parts or lips 4 and 12 on the end of the magnet ring 1 and on the end shield 23, respectively. The gutter 5 at the opposite end fits on a similar lip 4 on the magnet ring and has a lip 14 to receive a lip 15 on the end shield 16. The shield and gutters are clamped to the magnet ring by screws 22.

Figure 2:
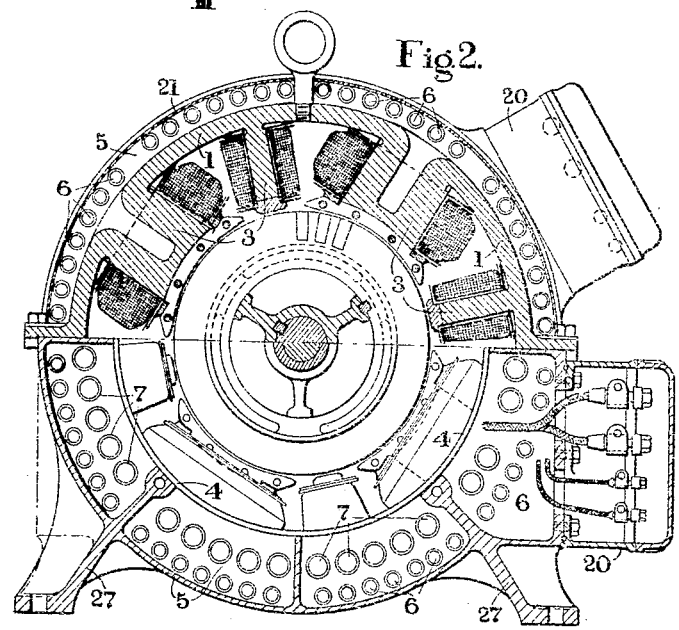
Figure 2 is an end sectional elevation, the upper half being a section on II—II, Figure 1, and the lower half a section on III—III Figure 1.

The end shield 16 encloses the commutator and brushes and in order to render these accessible in spite of the compact form of the motor and also to ensure a water tight joint for the inspection door or doors, the end shield 16 is cut away on the slant on one or two parts so as to present a flat jointing rim 17 at each part on to which a door 18 is fitted, the door having hinges 19. A terminal box 20 is also fitted over an opening on the casing. This opening and box may be arranged in any convenient position either as shown in elevation in the upper part of Figure 2 or as indicated in section in the lower part of Figure 2.

A sheet metal casing 21 surrounds the cooling tubes 6. It is conveniently supported between the gutters 5. The gutters are preferably provided with feet 27 and they may be made of aluminum or other light non-magnetic material with a view to reducing their weight.

I claim:—

1. An enclosed dynamo electric machine comprising a magnet ring having reduced ends, a system of hot-air cooling tubes arranged around and in close proximity to the larger diameter of said magnet ring, annular attachments fitted on the reduced ends of said magnet ring for supporting said system of hot-air cooling tubes, a system of cold-air ducts also supported by said annular attachments and arranged around and in close proximity to the reduced ends of said magnet ring, means for circulating the hot internal air of the machine through said hot-air cooling tubes, and means for creating a current of cold air through said cold air ducts into contact with the exterior of said hot-air tubes and of said magnet ring, substantially as and for the purpose hereinbefore set forth.

2. An enclosed dynamo electric machine comprising a magnet ring having reduced ends, annular gutters fitted to said reduced ends, hot-air cooling tubes connecting the interior of one of said gutters to the interior of the other and arranged around and in close proximity to the larger diameter of said magnet ring, a number of tubular ducts passing through each of said gutters and arranged around and in close proximity to the adjacent reduced end of said magnet ring, means for creating a current of cold air through said tubular ducts and into contact with the exterior of said hot-air cooling tubes, and means for circulating the hot internal air of the machine through said gutters and said hot-air cooling tubes, substantially as and for the purpose hereinbefore set forth.

3. An enclosed dynamo electric machine comprising a magnet ring having reduced ends, annular gutters fitted on said reduced ends, and communicating with the interior of the machine, hot-air cooling tubes connecting said gutters and arranged around and in close proximity to the larger diameter of said magnet ring, a casing surrounding said tubes, said gutters having cold air ducts arranged around and in close proximity to said reduced ends and communicating with the space enclosed by said casing, means for circulating the hot internal air of the machine through said gutters and said hot-air cooling tubes, and means for impelling cold air through said cold-air ducts and said space enclosed by said casing, in contact with said hot-air cooling tubes, substantially as and for the purpose hereinbefore set forth.

4. An enclosed dynamo electric machine comprising a magnet ring having reduced ends, annular gutters fitted to said reduced ends, hot-air cooling tubes connecting the interior of one of said gutters to the interior of the other and arranged around and in close proximity to the larger diameter of said magnet ring, a number of tubular ducts passing through each of said gutters and arranged around and in close proximity to the adjacent reduced end of said magnet ring, means for circulating the hot internal air of the machine through said gutters and said hot-air cooling tubes, a fan guard secured to one of said gutters, a fan within said guard for impelling air into the adjacent cold-air ducts and a commutator shield connected to the other of said gutters, said shield having a flat inspection door, substantially as and for the purpose hereinbefore set forth.

In testimony whereof I have signed my name to this specification.

HENRY CHARLES EDWARD JACOBY.